United States Patent [19]
Nitsche

[11] Patent Number: 4,934,197
[45] Date of Patent: Jun. 19, 1990

[54] METHOD OF MEASURING PRESSURES AND FORCES ACTING ON ARBITRARILY SHAPED BODIES

[76] Inventor: Wolfgang Nitsche, Cranachstrasse 21/22, 1000 Berlin 41, Fed. Rep. of Germany

[21] Appl. No.: 241,325

[22] Filed: Sep. 6, 1988

[30] Foreign Application Priority Data

Sep. 3, 1987 [DE] Fed. Rep. of Germany ....... 3729409

[51] Int. Cl.$^5$ ............................ G01L 1/16; G01L 5/16
[52] U.S. Cl. ............................... 73/862.04; 73/862.68; 310/338
[58] Field of Search ......... 73/862.04, 862.68, DIG. 4; 310/338, 366, 800

[56] References Cited

U.S. PATENT DOCUMENTS

| | | | |
|---|---|---|---|
| 4,539,554 | 9/1985 | Jarvis et al. | 310/338 X |
| 4,555,953 | 12/1985 | Dario et al. | 310/338 X |
| 4,615,214 | 10/1986 | Burns | 310/338 X |
| 4,744,253 | 5/1988 | Hermkens | 310/338 X |

FOREIGN PATENT DOCUMENTS 97227 5/1985 Japan ................................. 73/862.04

OTHER PUBLICATIONS

Title of Pub: "Electronics Week"; Title of Article: "Piezo Film Yields Novel Transducers"; Author: J. Victor Chatigny; Date: 8/87.
Title of Pub: "Kynar Piezo Film"; Company: Penwalt; Author: Prospekt; Date: 6/84.

Primary Examiner—Charles A. Ruehl
Attorney, Agent, or Firm—Thomas & Kennedy

[57] ABSTRACT

An indication is given of a method, and simultaneously of an apparatus, for measuring pressures and forces acting on arbitrarily shaped bodies. Employed in this connection is a piezoelectric film, which is provided on both sides with a metal coating. The piezoelectric film is bonded onto the body, and a charge variation of the piezoelectric film is evaluated in an evaluation unit, and employed as measure for the force acting on the body, or for the pressure. The metal coating (5) is partially removed from one side of the piezoelectric film (2) to form individual sensors (3, 4). Each individual sensor (3, 4) is coupled to the evaluation unit (10) via an electrical connection (8, 9). The other side of the piezoelectric film (2) with the continuous metal coating (5) serves as electronic shield and is connected to earth (7). The charge variation of each individual sensor (3, 4) serves as measure for the local force or the local pressure.

9 Claims, 2 Drawing Sheets

METHOD OF MEASURING PRESSURES AND FORCES ACTING ON ARBITRARILY SHAPED BODIES

FIELD OF THE INVENTION

The invention proceeds from a method of measuring pressures and forces acting on arbitrarily shaped bodies, in which a piezoelectric film, having a metal coating on both sides, is bonded onto the body, and in which a charge variation of the piezoelectric film is evaluated in an evaluation unit, and employed as measure for the force acting on the body or for the pressure. At the same time, there is indicated an apparatus for carrying out this method, having a piezoelectric film, which has a continuous metal coating on one side and an evaluation unit.

BACKGROUND OF THE INVENTION

Piezoelectric films are known. They are preferably manufactured from polyvinylidene fluoride, have a thickness between 10 micrometers and 100 micrometers, and a standard width of 300 mm. The piezoelectric film is coated on both sides with a thin, approximately 1 micrometer thick metal layer of aluminum, gold or nickel. Such films are suitable for determining the mechanical load acting on the films, since as a result of the mechanical load a charge variation occurs on the surface of the film, the so-called piezoelectric effect. This serves as measure for the load.

It is known from the publication "Sensor 85 Transducer-Technik, Entwicklung and Anwendung" [Sensor 85 Transducer Technology, Development and Application], Karlsruhe Exhibition Grounds, 21-23 May 1985, Conference Documents, to employ such piezoelectric films having a double-sided metal coating to measure pressures and forces on bodies. The piezoelectric film is bonded onto the body, and the charge variation of the piezoelectric film owing to the effect of the force or pressure is fed to an amplifier. The amplifier output signal then serves as measure for the force acting on the body or for the pressure. It is disadvantageous that the force acting on the body, or the pressure acting on the body, can be determined only as integral value over the surface of the film. It is not possible to determine the precise point of application. However, this is especially important in many investigations of flow. Furthermore, it is disadvantageous that the simultaneous survey of an extensive field is not possible, or is possible only at considerable expense. The sphere of application of these piezoelectric films is therefore limited.

Furthermore, a piezoelectric film is known in which the metal coating is mounted on only one side. The other side of the film is printed with special conductor tracks, for example using the screen printing technique. Although it is possible with this piezoelectric film to measure simultaneously at more than one location, it has the disadvantage, however, that the signal transmitted by the piezoelectric film for the particular location is different given the same stress owing to force or pressure, since the imprinted conductor tracks have different layer thicknesses, and therefore also different line capacities and resistances. In addition, printed piezoelectric films are very prone to breakage in the region of the conductor tracks.

Only quantitative measurements are possible with the piezoelectric films, therefore both with those coated on both sides and also with those coated on one side and printed, since the longitudinal variation of the films reacts to forces in all three axes. With superimposed loads, such as normally occur, it is not possible to filter out any individual components.

SUMMARY OF THE INVENTION

It is the object of the invention to indicate a method and an apparatus, with which it is possible simply and quickly to carry out extensive field measurements without having to undertake structural alterations of the body.

This is achieved according to the invention in that the metal coating is partially removed from one side of the piezoelectric film to form individual sensors, in that each individual sensor is coupled to the evaluation unit via an electrical connection, in that the other side of the piezoelectric film having the continuous metal coating is employed as electronic shield and connected to earth, and in that the charge variation of each individual sensor is employed as measure for the local force or the local pressure. It is, therefore, the known piezoelectric film coated on both sides which is employed. With this film, the metal coating is removed on one side in such a way that individual sensors are produced at predetermined locations. The removal of the metal coating can take place by laying on a mechanical mask, which covers the regions in which the metal coating is to be retained, followed by an abrasion process. Very fine-grained abrasion paste has proved to be especially advantageous as abrasive. It is possible, therefore, to arrange a multiplicity of individual sensors on one and the same piezoelectric film. In this connection, the individual sensors lie at predetermined locations. The form and the structure of the particular individual sensors can be chosen freely. It is possible in this way, for example, to form punctiform, and also strip-shaped individual sensors, depending on which application the piezoelectric film is intended for. It is also possible in this way to manufacture especially small individual sensors, so that a quasi-punctiform measurement is possible. This piezoelectric film is then bonded onto the body, namely in such a way that the side of the piezoelectric film having the continuous metal coating comes to lie on top, the individual sensors therefore lying directly on the body. The body can have a largely arbitrary form of the body surface, since the piezoelectric film is elastic and flexible. Each individual sensor is coupled to the evaluation unit via an electrical connection. The piezoelectric effect of each individual sensor is interrogated and recorded either simultaneously or sequentially. Because the piezoelectric effect is only very slight, the danger of extraneous or interference effects is very great. It has turned out to be especially advantageous to employ the continuous metal layer as electronic shield, and to connect it to earth, in order to avoid these effects. With this method, it is possible for the first time to observe and survey extensive force fields with the arbitrarily enhancable number of measurement points, without thereby having to undertake structural alterations, or to disturb the flow. In this connection, the piezoelectric effect is recorded practically free of delay and unattenuated, which is important especially for non-stationary measurements. The piezoelectric film with the individual sensors is mechanically and chemically insensitive, and operates in the temperature range from approximately −40° C. to 150° C., thus creating a wide spectrum of possibilities for application. No external energy supply is required to the individual sensors.

The piezoelectric film can be bonded onto the body with a hard bonding agent. This has the advantage that even under the effect of thrust forces or tangential forces the piezoelectric film, and therefore also the individual sensors, always preserve their predetermined location on the body. Furthermore, it is possible to break the bonded joint once again, and so to re-employ the piezoelectric film for further measurements.

It is an advantageous possibility to combine two individual sensors in each case to form a double sensor. The propagation time of a disturbance between the two individual sensors is then recorded, and used in conjunction with the sensor separation to compute the velocity. If required, it is then possible to compute further magnitudes with the aid of the velocity.

It is possible for the piezoelectric film to be mounted with a soft bonding agent in the region of the double sensors and with a hard bonding agent otherwise, and for the charge variation of the two individual sensors of the double sensor to be superimposed. The possibility therefore exists of separating pressure forces and thrust forces, and determining them separately. Owing to the thrust forces, one individual sensor of the piezoelectric film is pulled in the direction of the thrust forces, and the other individual sensor is correspondingly compressed. Consequently, the output signal of the two individual sensors is phase-shifted, or differs in algebraic sign. By superimposing the two output signals, the two-fold pressure force is obtained by addition, and the double thrust force by subtraction.

The apparatus for carrying out the method according to claim 1 is characterized in that the piezoelectric film has a multiplicity of individual sensors on the side opposite that provided with the metal coating, in that an electrical connection is provided from each individual sensor to the evaluation unit, and in that a connection to earth is arranged at the metal coating. The piezoelectric film therefore has many individual sensors, which can have different sizes, structure and position according to the particular applications. Platinum wire can be provided as electrical connection, the platinum wire being bonded to the individual sensors with the aid of an electrically conducting bonding agent. The use of the bonding agent guarantees a reliable joint between the individual sensor and the platinum wire. In this connection, the manufacture of the joint is simple and can be carried out precisely. It has proved to be especially advantageous to choose a thickness of the platinum wire of 50 micrometers, and to lay the platinum wire in the bonding layer between the body and the piezoelectric film. In this way, no disturbances arise in the flow, and a reliable transmission of the output signal of the individual sensor is provided, despite everything. It is possible for only one evaluation unit to be provided for all individual sensors, a change-over switch then being arranged before the evaluation unit for changing over from one individual sensor to the other. Although this harbors the disadvantage that not all output signals of the individual sensors can be acquired simultaneously, it does have the advantage that a substantially smaller construction is required for the apparatus. A quicker measurement operation is possible despite everything owing to the provision of the change-over switch. The evaluation unit can preferably have a charge-sensitive amplifier or a volt-sensitive amplifier with enhanced input resistance. In this connection, the input resistance of the voltage-sensitive amplifier should lie between 80 megaohm and 105 megaohm. This results in a very good agreement between the variation of the pressure applied, or of the force applied, on the piezoelectric film, and the output signal from the amplifier. By contrast, a commercially available broad-band amplifier with a relatively low input resistance of approximately 1 megaohm returns only approximately the differential value of the load of the piezoelectric film. This is to be explained by the piezoelectric output signal of the piezoelectric film which is only very small, as well as by the high volume resistivity of approximately $5 \cdot 10^8$ megaohm cm. In the final analysis, however, the choice of the amplifier will depend on the particular measurement problem. In this connection, the lower critical frequency is especially decisive: In the measurement of high-frequency pressure or force fluctuations, volt-sensitive amplifiers are entirely capable of returning satisfactory results, while charge-sensitive amplifiers substantially improve the quality of the results for quasi-static measurements.

BRIEF DESCRIPTION OF THE DRAWINGS

The invention is described further with the aid of illustrative embodiments.

DETAILED DESCRIPTION

Figure 1:
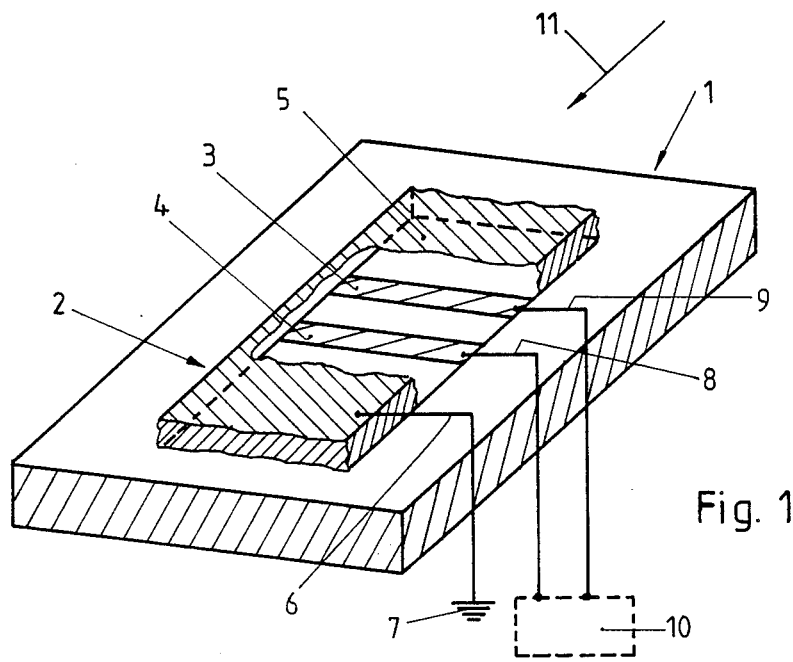
FIG. 1 shows a schematic plan view of a body provided with a piezoelectric film.

FIG. 1 shows a body 1, on which a piezoelectric film 2 is mounted. The piezoelectric film 2 has two individual sensors 3 and 4. The individual sensors 3 and 4 can have an arbitrary shape, which is adapted to the corresponding measurement project. More than the two individual sensors 3 and 4 represented here are, of course, also possible. On the side opposite the individual sensors 3 and 4, a metal coating 5 is applied to the piezoelectric film 2. The metal coating 5 is connected to earth 7 via the line 6. An electrical connection 8 and an electrical connection 9 connect the individual sensors 3 and 4 to an evaluation unit 10 not represented further here. By virtue of a force or force distribution acting on the body 1, a piezoelectric voltage is generated in the regions of the individual sensors 3 and 4, and is fed to the evaluation unit 10 via the electrical connections 8 and 9. The piezoelectric voltage is proportional to the force acting on the body 1. The electronic shielding of the piezoelectric film 2 is effected by the metal coating 5, which is connected to earth 7 via the line 6. By virtue of the known position of the individual sensors 3 and 4, the point of application of the force is known. The two individual sensors 3 and 4 represented here have an elongated extent and can be used, for example, to measure the velocity of a medium flowing in the direction of an arrow 11. In this connection, a disturbance caused by the flow medium is recorded by the individual sensor 3, and, after a certain time interval, by the individual sensor 4, as well. The flow velocity then ensues from the known separation of the individual sensors 3 and 4, in relation to the time which the disturbance requires to cover this separation. These individual sensors 3 and 4 are not suitable for punctiform measurements, since the piezoelectric voltage is proportional to the integration of the force acting on the particular individual sensor 3 or 4. If punctiform measurements are to be carried out, the piezoelectric film 2 can be treated in such a way that the individual sensors 3 and 4 are represented as small circles of only limited extent. The piezoelectric film 2 can therefore be ideally adapted to the particular measurement conditions, in that the individual sensors 3 and 4 can be manufactured in arbitrary form and quantity by the partial removal of the metal coating.

Figure 2:
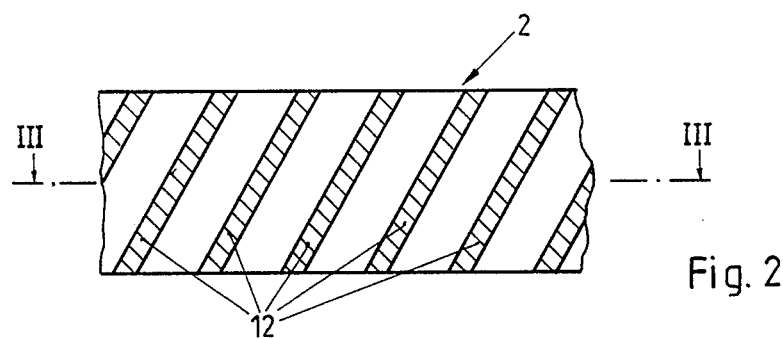
FIG. 2 shows a plan view of the piezoelectric film.

FIG. 2 shows the plan view of the piezoelectric film 2, on which several individual sensors 12 are arranged. Here, too, the individual sensors have an elongated extent. Such a piezoelectric film 2 with individual sensors 12 can be used, for example, to establish the transition point from laminar flow to turbulent flow on a wing. In this connection, it is important to measure the changes of the pressure fluctuations parallel to the leading edge of the wing. This measurement then takes place with the individual sensors 12.

Figure 3:
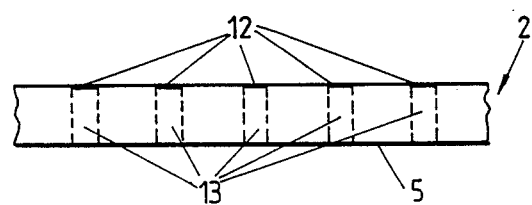
FIG. 3 shows a section according to III-III in FIG. 2.

FIG. 3 shows a sectional representation through the piezoelectric film 2 according to FIG. 2. Clearly in evidence here, once again, are the metal coating 5 on one side of the piezoelectric film 2, and the individual sensors 12 arranged on the opposite side. Regions 13 are formed, which are bounded on one side of the piezoelectric film 2 by the individual sensors 12, and on the other side by the metal coating 5. It is only in these regions 13 that the piezoelectric effect becomes operative, so that only the pressures or forces acting on the individual sensors 12 are recorded.

Figure 4:
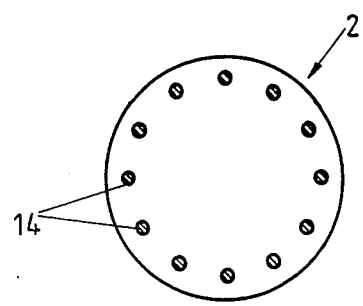
FIG. 4 shows a further embodiment of the individual sensors.

FIG. 4 shows a further embodiment of the piezoelectric film 2 with individual sensors 14. This piezoelectric film 2 is especially well suited for punctiform measurements. Of course, it is also possible to combine strip-shaped individual sensors 12, see FIG. 2, and punctiform individual sensors 14 on one and the same piezoelectric film 2. The size of the individual sensors 14 lies in the region of 1 mm$^2$.

Figure 5:
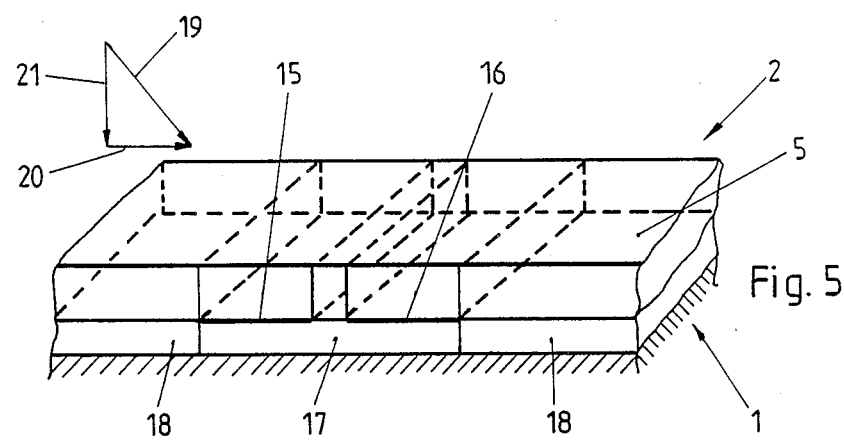
FIG. 5 shows a double sensor for separating pressure forces and thrust forces.

FIG. 5 shows the piezoelectric film 2 on which two individual sensors 15 and 16 are arranged. The piezoelectric film 2 is attached to the body 1 with a soft bonding agent 17 in the region of the individual sensors 15 and 16, and with a hard bonding agent 18 either side of the individual sensors 15 and 16. This piezoelectric film 2 can always be used when superimposed forces act on the body, and the individual force components are to be determined. If a force 19 acts on the piezoelectric film 2, i.e. on the individual sensors 15 and 16, both the tangential components of the force 19, and also the normal components, therefore a tangential force 20 and a normal force 21, are transformed in principle into a proportional voltage. With the piezoelectric film 2 in question here, the individual sensor 15 is pulled in the direction of the tangential force 20 or of the thrust force. By contrast, the individual sensor 16 is compressed in the same direction.

Figure 6:
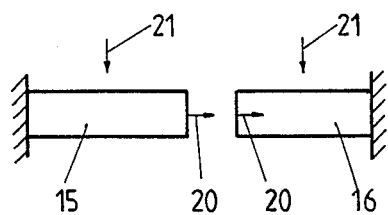
FIG. 6 shows an equivalent mechanical model of the double sensor according to FIG. 5.

FIG. 6 illustrates this process with the aid of an equivalent mechanical model. In each case, the individual sensors 15 and 16 are rigidly clamped to a side, namely to a different side, in each case. The same normal force 21 acts on the individual sensors 15, 16. By virtue of the tangential force 20, which like-wise acts on the individual sensors 15 and 16 with the same intensity and in the same direction, the individual sensor 15 is pulled in the direction of the tangential force 20, and the individual sensor 16 is compressed in the direction of the tangential force 20. Consequently, the voltage of the piezoelectric film 2 of the individual sensor 16 has a different algebraic sign than the voltage of the individual sensor 15, while the magnitude of the voltage of the individual sensors 15 and 16 is the same. By superimposing the voltages of the individual sensor 15 and of the individual sensor 16, the normal force 21 and the tangential force 20 can now be determined individually as components of the force 19. The addition of the voltage of the individual sensor 15 to that of the individual sensor 16, then yields the double normal force 21, and the subtraction the double tangential force 20.

While the preferred embodiments of the invention have been disclosed herein, it will be understood that variations and modifications of the disclosed embodiments might be made without departing from the spirit and scope of the invention as defined in the following claims.

List of reference numerals:

1 = Body
2 = Piezoelectric film
3 = Individual sensor
4 = Individual sensor
5 = Metal coating
6 = Line
7 = Earth
8 = Electronic connection
9 = Electronic connection
10 = Evaluation unit
11 = Arrow
12 = Individual sensor
13 = Region
14 = Individual sensor
15 = Individual sensor
16 = Individual sensor
17 = Soft bonding agent
18 = Hard bonding agent
19 = Force
20 = Tangential force
21 = Normal force

I claim:

1. A method of measuring pressures and forces acting on arbitrarily shaped bodies comprising the steps of applying a metal coating to both sides of a piezoelectric film, the coated piezoelectric film being sufficiently flexible to conform to the shape of the body upon which the pressures and forces are incident, removing parts of the metal coating (5) from one side of the piezoelectric (2) to form individual sensors (3, 4, 14, 15, 16), coupling each individual sensor (3, 4, 14, 15, 16) to an evaluation unit (10) via an electrical connection (8), with the other side of the piezoelectric film (2) having the continuous metal coating (5) being employed as an electronic shield and connected to earth (7), bonding the coated piezoelectric film to the body with the side of the film which had the metal coating removed therefrom positioned adjacent and facing the body, and evaluating the charge variation of each of the individual sensors (3, 4, 14, 15, 16) in the evaluation unit upon the application of force or pressure to the body.

2. The method according to claim 1, characterized in that the piezoelectric film (2) is bonded onto the body (1) with a hard bonding agent (18).

3. A method of measuring pressures and forces acting on arbitrarily shaped bodies with a piezoelectric film having a continuous metal coating on a first side of the film and an interrupted metal coating on a second side of the film defining individual sensors, comprising the steps of bonding the film to an arbitrarily shaped body with the second side of the film having the interrupted metal coating positioned adjacent and facing the arbitrarily shaped body, electrically connecting the individual sensors to an evaluation unit, electrically connecting the continuous metal coating to earth to provide an electronic shield adjacent the sensors, evaluating the charge variation of the individual sensors in the evaluation unit under the application of force or pressure to the body, combining individual sensors (3, 4, 15, 16) to form a double sensor, and wherein the the step of bonding the film to the body comprises mounting the piezoelectric film (2) to the body with a soft bonding agent (17) in the region of the double sensors and elsewhere with a hard bonding agent (18), and wherein the charge variations of the individual sensors of the double sensor are superimposed.

4. An apparatus for measuring pressures and forces acting on an arbitrarily shaped body, said apparatus comprising a piezoelectric film including a first side having a continuous metal coating applied thereto and a second side opposite said first side having a second metal coating applied thereto and facing the body, said film and coated sides having sufficient flexibility to conform to the shape of the body upon which the pressures and forces are incident, said second metal coating having a plurality of spaced discontinuities therein defining a plurality of spaced individual sensors, the apparatus further comprising an evaluation unit, each of said individual sensors having a single electrical connection (8) to said evaluation unit (10), and means electrically connecting said continuous metal coating (5) to ground, whereby the continuous metal coating insulates the sensors from electrical interference from sources external of the body.

5. Apparatus according to claim 4, characterized in that the evaluation unit (10) has a charge-sensitive amplifier or a voltage-sensitive amplifier with enhanced input resistance.

6. An apparatus as claimed in claim 4 wherein electrical coupling wire is bonded to said individual sensors with the aid of an electrically conducting bonding agent adjacent said second metal coating.

7. An apparatus as claimed in claim 4 wherein individual sensors are combined to form a double sensor and wherein the piezoelectric film is bonded to the body with a soft bonding agent in the region of the double sensor and elsewhere bonded to the body with a hard bonding agent.

8. An apparatus for measuring pressures and forces acting on an arbitrarily shaped body, said apparatus comprising a piezoelectric film including a first side having a continuous metal coating and a second side opposite said first side for placement adjacent the body and having a second metal coating, said second metal coating having a plurality of discontinuities therein forming a plurality of spaced individual sensors, said film and coated sides having sufficient flexibility to conform to the shape of the body upon which the pressures and forces are incident, the apparatus further comprising an evaluation unit (10), each of said individual sensors having a single electrical connection (8) to said evaluation unit (10), and means electrically connecting said continuous metal coating (5) to ground, wherein platinum wire is provided as the electrical connection (8), and in that the platinum wire is bonded to the individual sensor (3, 4, 14, 15, 16) with the aid of an electrically conducting bonding agent.

9. A method of measuring pressures and forces acting on a body with a piezoelectric film having a continuous metal coating on a first side of the film and an interrupted metal coating on a second side of the film to form individual sensors, comprising the steps of bonding the film to the body with the second side of the film having the interrupted metal coating adjacent and facing the body, electrically connecting the individual sensors to an evaluation unit, electrically connecting the continuous metal coating to earth to provide an electronic shield, and evaluating the charge variation of the individual sensors in the evaluation unit under the application of force or pressure to the body.

* * * * *